May 29, 1923.
A. L. EATON ET AL
VEHICLE BODY
Filed May 23, 1921    3 Sheets-Sheet 3
1,456,630
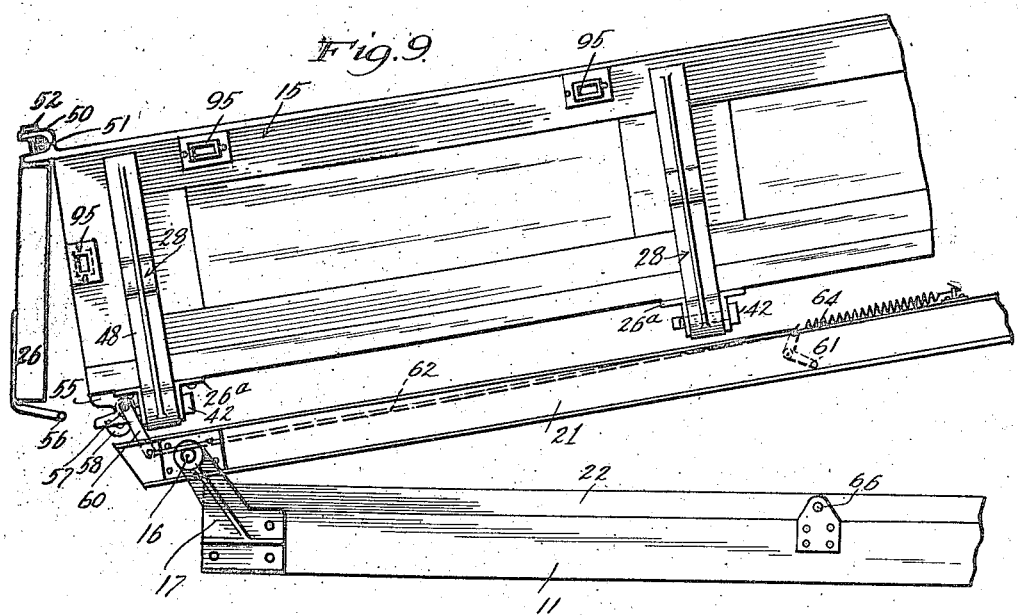
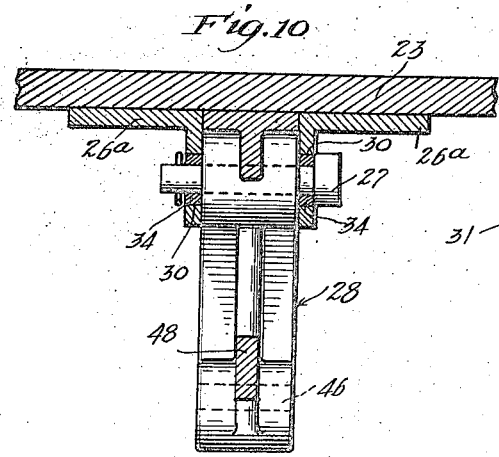
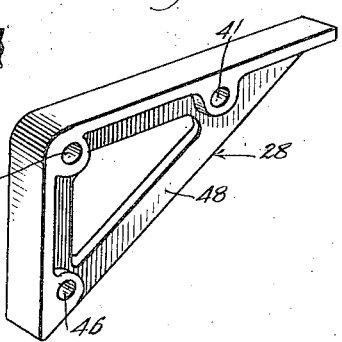
Inventors
Arthur L. Eaton
Harry F. Vickers,
By James T. Berkeley
his Attorney Patented May 29, 1923.

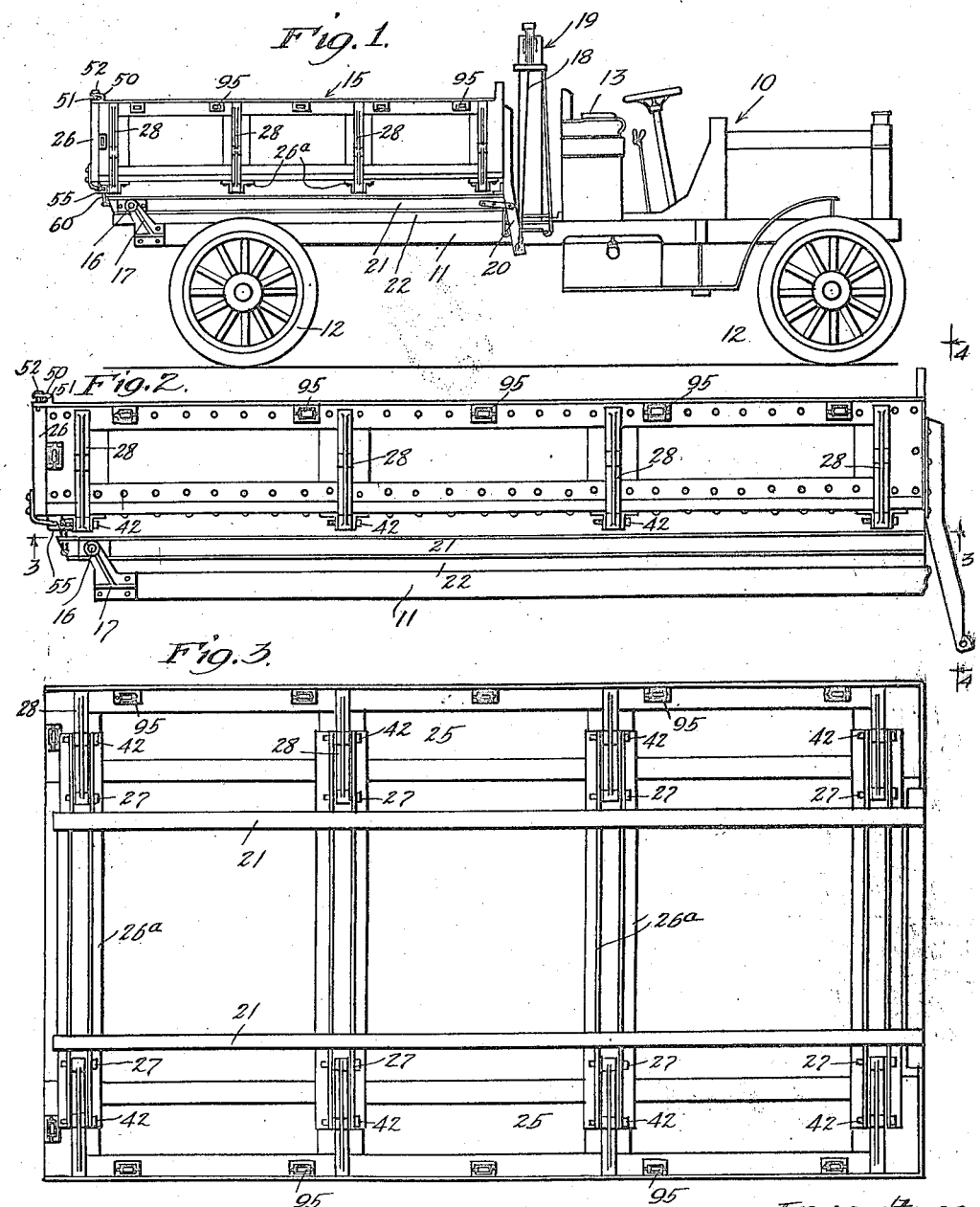

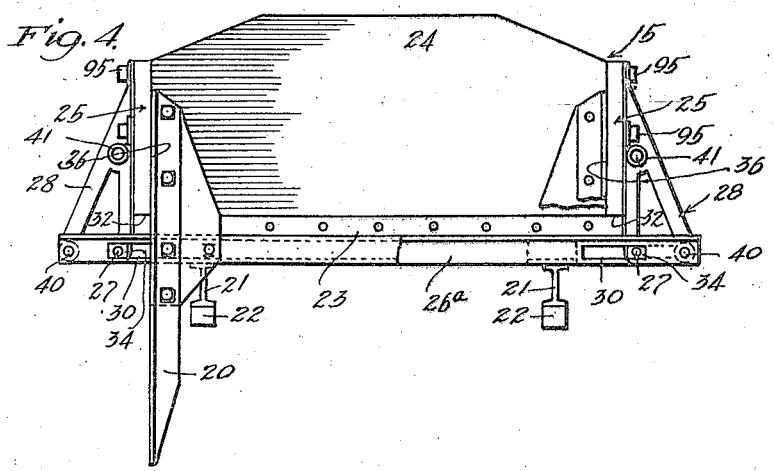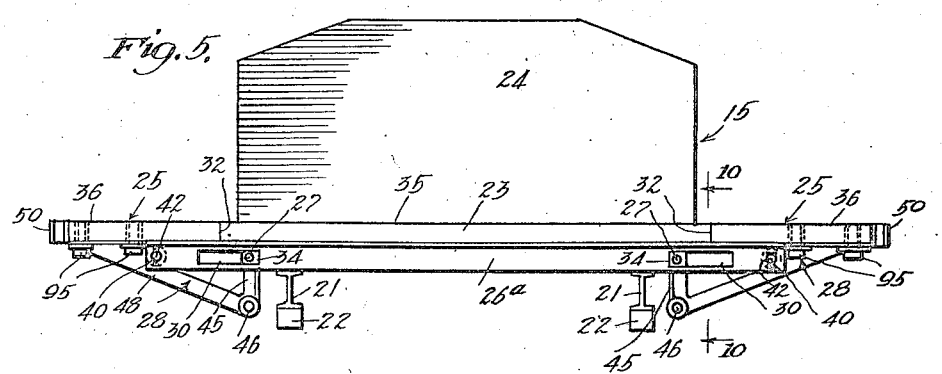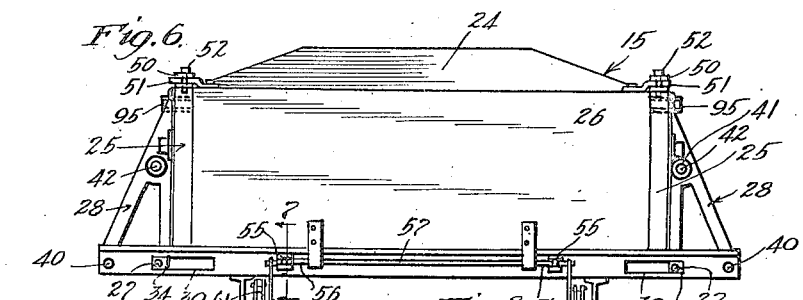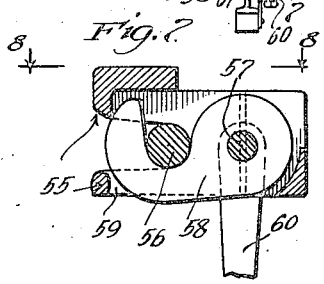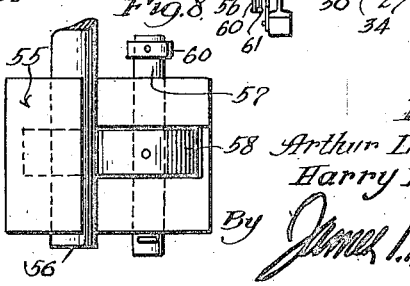

1,456,630

UNITED STATES PATENT OFFICE.

ARTHUR L. EATON AND HARRY F. VICKERS, OF LOS ANGELES, CALIFORNIA; SAID VICKERS ASSIGNOR TO SAID EATON.

VEHICLE BODY.

Application filed May 23, 1921. Serial No. 471,580.

*To all whom it may concern:*

Be it known that we, ARTHUR L. EATON and HARRY F. VICKERS, both citizens of the United States, residing in Los Angeles, county of Los Angeles, State of California, have jointly invented new and useful Improvements in Vehicle Bodies, of which the following is a specification.

This invention has to do with a vehicle body and more particularly with a body such as may be used on a motor truck or the like, and it is an object of the invention to provide a simple, effective, improved device of this character.

A primary object of the invention is to provide a simple, effective, easily operated body which can be arranged either in the form of a plane flat platform or in the form of an open topped box.

A noteworthy feature of the invention is the manner in which the parts of the body fit together and are held together to form a tight continuous structure whether arranged as a box like structure or as a platform.

Another important feature of the invention is the manner in which the tail gate is connected to, or with, the other parts of the body. The tail gate is releasably hinged at its lower edge to the bottom of the body and is adapted to be releasably hinged at its upper edge to the sides of the body when they are up. The body, therefore, can be used as a dump body by hinging the tail gate at its upper edge, as a body for general use by hinging the tail gate at its lower edge, or it may be used without the tail gate, for instance the tail gate may be allowed to hang downwardly from the bottom or may be completely detached or removed from the rest of the body.

Another distinctive feature of the invention is the mechanism provided for operating the means by which the tail gate is connected to the bottom of the body. The invention provides an arrangement and mechanism by which the tail gate will automatically be released when the body is being used as a dump body and is moved to a position to discharge, and which will automatically lock when the body is again moved to normal or carrying position.

The various objects and features of the invention, including those just pointed out, will be best and more fully understood from the following detailed description of a typical embodiment of the invention throughout which reference is had to the accompanying drawings in which—

Fig. 1 is a side elevation of a typical motor truck equipped with a body embodying the present invention; Fig. 2 is an enlarged side elevation of the body provided by the present invention; Fig. 3 is a bottom plan view of the body, being a view taken as indicated by line 3—3 of Fig. 2; Fig. 4 is a view of the front end of the body with certain parts broken away, being a view taken as indicated by line 4—4 on Fig. 2; Fig. 5 is a view taken from the rear of the body showing it arranged to form a flat platform and with the tail gate removed; Fig. 6 is a view taken from the rear of the body showing it arranged to form an open topped box like structure and showing the tail gate in place and closed; Fig. 7 is an enlarged detailed sectional view taken as indicated by line 7—7 on Fig. 6; Fig. 8 is a view of the parts shown in Fig. 7 being a view taken as indicated by line 8—8 on Fig. 7; Fig. 9 is a side elevation of the body arranged as a dump body showing it in position to discharge and showing the tail gate open; Fig. 10 is an enlarged detail sectional view taken as indicated by line 10—10 on Fig. 5 and Fig. 11 is a perspective view of one of the brackets by which the sides of the body are connected to the bottom thereof.

In the drawings numeral 10 designates a typical motor truck which comprises, generally, a frame 11 supported by wheels 12, a driver's or operator's seat 13, and a steering wheel 14 arranged in front of the seat 13. The body 15, provided by the present invention, is arranged or mounted on the rear portion of the truck frame 11 being pivotally connected at its rear end to the rear end of the truck frame by a pivot rod 16 carried in brackets 17 which are mounted on the rear end of the truck frame. The forward end of the body 15 is connected by cables 18 to a suitable hoist or jack mechanism 19 which is mounted on the truck frame 11 between the forward end of the body 15 and the seat 13. The cables 18 of the hoist mechanism 19 connect to suitable arms 20 which extend downwardly from the forward end of the body 15 in the manner clearly illustrated in Figs. 1 and 2. In practice it is desirable to provide longitudinal sills 21 on the bottom of the body 15 to engage or seat on sills 22 mounted on the longitudinal members of frame 11.

The body 15, provided by the present invention, comprises, generally, a bottom 23, a forward or front end 24, sides 25 and a rear end or tail gate 26. The bottom 23, which is a flat continuous structure or member, is solidly and preferably permanently mounted on the longitudinal sills 21 by means of transverse frame members 26$^a$. It will be obvious, of course, that the bottom 23 may be of any size or proportions and that it may be made of any suitable material.

The front end 24 of the body is preferably, although not necessarily, solidly and permanently secured in a perpendicular position at the extreme forward end of the bottom 23. The front end 24, like the bottom 23, may be of any desired design or proportions and may be of any suitable material.

The sides 25 of the body 15 are arranged at the two longitudinal edges of the bottom 23 and are connected to the bottom 23 by pivot pins 27 in a manner to permit of them being disposed either perpendicularly of the bottom 23 or parallel with the bottom 23 and at the same plane as the bottom 23. Although each of the sides 25 is preferably secured to the body 23 by a plurality of pins 27, as we have shown in the drawings, we will proceed to describe only one of the pins and the manner in which it connects a side 25 with the bottom 23 it being understood, of course, that the description is applicable to all of the pins.

In accordance with the present invention the pivot pin 27 in connecting the two parts, namely, the side 25 and the bottom 23, is carried in a fixed position relative to one of the parts and is movable relative to the other. In the particular arrangement shown in the drawings, the pin 27 is carried in a fixed position in a bracket 28 secured to the side 25 to form a projection or extension thereof, and is slidably carried in guide-ways 30 formed in suitably arranged transverse frame members 26$^a$, which, being secured to the bottom 23, form or act as projections or extensions thereof. The pin 27 is carried in a bore 31 provided in a portion of the bracket 27 which extends beyond or outwardly of the inner edge 32 of the side 25. The transverse frame members 26$^a$, in which the guide ways 30 are provided, are spaced apart sufficiently to receive the bracket 28 between them as clearly illustrated in Fig. 10 of the drawings. It is preferred, although not necessary, to provide sliding blocks 34 in the guide ways 30 to rotatably carry the end portions of the pin 27. With the side 25 thus slidably pivotally connected to the bottom 23 it will be readily understood how it may be arranged with its inner edge 32 at the edge portion of the upper side 35 of the bottom 23, or how it may be arranged with its inner edge 32 close against the edge of the bottom 23 so that it forms practically a continuation of the bottom 23 having its inner surface 36 parallel to and in the same plane as the surface 35 of bottom 23. When the side 25 is in the first mentioned position the blocks 34 carrying the pin 27 are at the outer end portions of the guide ways 30 and when it is the last mentioned position the blocks 34 are at the inner end portions of the guide ways 30. In accordance with the invention the frame members 26$^a$, having in them the guide-ways 30 for the blocks 34, extend considerable distance beyond the edge of the bottom 23 so that they form a support for the side 25 when it is in the out position as clearly illustrated in Fig. 5.

In order that the side 25 may be releasably secured in the out position as shown in Fig. 5 we provide openings 40 in the frame member 26$^a$ at points removed from, and preferably outward of, the guideways 30 therein. An opening or bore 41 is provided in the bracket 28 to register with the openings 40 when the side 25 is properly positioned relative to the bottom 23. A pin 42, or a like member, may be arranged through openings 40 and 41 to positively and solidly secure or hold the sides 25 in the out position as shown in Fig. 5. The pin 42 connecting the frame member 26$^a$ with the bracket 28 at a point spaced or removed from the pivot pin positively prevents any rotary or swinging motion of the guide 25, as about the pivot pin 27, and in extending with ordinary accuracy or tightness through the openings 40 and 41 positively prevents any sliding or longitudinal movement of the side 25 relative to the bottom 23, such as movement of the blocks 34 in the guide ways 30. It is preferred that the openings 40 be provided in the frame member 26$^a$ outwardly of the guide ways 30 as clearly shown in the drawings.

To lock the side 25 up, as it is shown in Figs. 1, 2, 4, 6 and 9 we provide the brackets 28 with an extension or arm 45 in which there is an opening 46 which registers with the openings 40 in the frame members 26$^a$ when the side 25 is in the desired up or perpendicular position. A suitable pin, or the like, arranged through the openings 40 and 46 will obviously hold the side 25 firmly and solidly in the desired position and against any movement relative to the bottom 23.

It will be particularly noted that when the side 25 is in the out position, as shown in Fig. 5, its inner edge 32 seats or engages tightly against the edge of the bottom 23 and when the side 25 is in the up position, as shown in Fig. 4, its inner edge 32 seats or bears tightly against the edge portion of the upper surface 35 of the bottom 23. In other words, the invention provides a construction and arrangement whereby a tight joint is made between the side 25 and bottom 23 when the body is in the up position and when it is in the out position.

In practice the arm 45 of the bracket 28 may be braced by a diagonal brace member 48 so that the bracket is of strong and rigid construction and so that the side 25 is braced when it is in the up position, as shown in Fig. 4. It will be obvious how the bracket 28 may be very easily cast or otherwise suitably formed and how the sides 25 may be changed between the two positions just described very easily and quickly.

The tail gate 26 is designed and proportioned to extend upwardly from the rear end of the bottom 23 and between the sides 25 which are in the up position as shown in Figs. 4 and 6. In accordance with the invention rearwardly facing U-shaped brackets 50 are arranged at the upper rear corners of the sides 25 to receive pivot pins 51 which extend from the upper corners of the tail gate in the manner clearly illustrated in Figs. 6 and 9. The pivot pins 51 are adapted to be secured in the brackets 50 by removable pins 52 which are adapted to extend across the outer parts of the brackets 50 in the manner clearly illustrated in Figs. 6 and 9. With this construction the tail gate 26 is detachably pivotally connected to the upper rear corners of the sides 25 so that it can swing outwardly at the bottom as shown in Fig. 9.

At the under side and rear end of the bottom 23 there is a pair of U-shaped brackets 55 adapted to receive a bar 56 which is mounted on the tail gate 26 to extend parallel with its lower edge as shown in the drawings. The rod 56 is adapted to extend into the U-shaped bracket 55 when the tail gate is closed as shown in Figs. 1, 2 and 6. A shaft 57 extends between the brackets 55 and a hook 58 is secured on the shaft 57 at each of the brackets. The hooks are adapted to operate through openings 59 in the lower sides of the brackets 55 to extend across the outer portions of the brackets and thereby secure or retain the rod 56 in place, in the manner clearly illustrated in Figs. 7 and 8. It will be obvious how suitable rotation of the shaft 57 will cause the hooks 58 to extend across the outer parts of the bracket to retain the rod 58 in the manner shown in Figs. 7 and 8, and how it may be operated to cause the hooks to withdraw from the brackets and release the rod 56. In accordance with the present invention the shaft 57 is adapted to be operated automatically when the body 15 is tilted or lifted by the hoist mechanism 19, to release the rod 56 and thereby allow the tail gate to swing open, and is adapted to operate automatically to move the hooks into the brackets and thereby retain the rod 56 when the body is moved to its normal position as shown in Figs. 1 and 2. A lever 60 is mounted on each end of the shaft 57 and is connected with bell cranks 61, pivotally mounted on the sills 21 at points somewhat inwardly of the end of the body, by connecting rods 62. The bell cranks 61 are normally moved to the position shown in Fig. 9, in which position the lever 60 is swung rearwardly and the hooks 58 are withdrawn from the bracket, by a suitable spring 64. The bell cranks 61 are located to engage stops 66 mounted on the truck frame when the body is lowered and is in its normal position. As the body is lowered the bell cranks 61 engage the stops 66 which cause them to move around from the position shown in Fig. 9, to cause the levers 60 to be swung outwardly so that the shaft 57 is rotated and the hooks 58 are moved across the outer parts of the brackets 55 to retain the rod 56 securely in place, as illustrated in Figs. 7 and 8. It will be obvious how this mechanism operates to automatically release the tail gate when the body is raised to dumping position and how it automatically secures the tail gate in closed position when the body is moved to, or is in normal position.

In the preferred form of the invention a plurality of stake pockets 95 are suitably arranged in the sides 25 to receive stakes when this body is in the flat or extended position. The pockets 95 are preferably within the edges of the sides as shown in the drawings. When the body is being used as a dump body or the like the suitable plugs may be arranged in the pockets to close them.

Having described only a preferred embodiment of our invention we do not wish to limit ourselves to the particular details hereinabove set forth but wish to reserve to ourselves any changes or variations that may appear to those skilled in the art or that may fall within the scope of the following claims:

Having described a preferred form of our invention, we claim:

1. In a vehicle body, a bottom, a side, a member arranged in connection with the bottom to project from its edge, the member having a guide slot in it, a block slidably carried by the slot, and a bracket attached to the side and having pivotal connection with the block so that the side can be positioned to project from the edge of the bottom in the plane of the bottom or to project upwardly from the bottom, the bracket having parts adapted to be connected with said member to hold the side in either of said positions.

2. In a vehicle body, a bottom, a side, two spaced members attached to the bottom to project from its edge, the members having guide slots in them at the edge portion of the bottom and having openings at their outer ends, blocks slidably carried in the slots, a rigid bracket rigidly attached to the side, means pivotally connecting the bracket with the blocks so that the side can be positioned to extend from the edge of the bottom in the plane of the bottom and to extend from the edge of the bottom upwardly at substantially right angles to the bottom, the bracket having openings adapted to register with the openings in said members when the side is in either of said positions, and a pin adapted to be arranged through the registering openings to hold the side in position relative to the bottom.

In witness that we claim the foregoing we have hereunto subscribed our names this 18th day of May 1921.

ARTHUR L. EATON.
HARRY F. VICKERS.

Witness:
VIRGINIA BERINGER.